(12) United States Patent
Finchelstein et al.

(10) Patent No.: US 11,876,783 B2
(45) Date of Patent: Jan. 16, 2024

(54) METHOD OF SECURE COMMUNICATION AND SYSTEM THEREOF

(71) Applicant: KAZUAR ADVANCED TECHNOLOGIES LTD., Tel-Aviv (IL)

(72) Inventors: Daniel Mondy Finchelstein, Rishon Lezion (IL); Yuval Moshe Porat, Tel Aviv-Jaffa (IL); Yaacov Fenster, Petach Tikvah (IL)

(73) Assignee: KAZUAR ADVANCED TECHNOLOGIES LTD., Tel-Aviv (IL)

( * ) Notice: Subject to any disclaimer, the term of this patent is extended or adjusted under 35 U.S.C. 154(b) by 437 days.

(21) Appl. No.: 17/290,946

(22) PCT Filed: Nov. 13, 2019

(86) PCT No.: PCT/IL2019/051238
§ 371 (c)(1),
(2) Date: May 3, 2021

(87) PCT Pub. No.: WO2020/105032
PCT Pub. Date: May 28, 2020

(65) Prior Publication Data
US 2021/0377219 A1     Dec. 2, 2021

(30) Foreign Application Priority Data
Nov. 21, 2018   (IL) .......................................... 263181

(51) Int. Cl.
*H04L 29/06*       (2006.01)
*H04L 9/40*        (2022.01)
(Continued)

(52) U.S. Cl.
CPC ........ *H04L 63/0245* (2013.01); *H04L 9/3247* (2013.01); *H04L 63/123* (2013.01); *H04L 63/205* (2013.01); *H04L 9/50* (2022.05)

(58) Field of Classification Search
CPC . H04L 63/0245; H04L 9/3247; H04L 63/123; H04L 63/205; H04L 9/50;
(Continued)

(56) References Cited

U.S. PATENT DOCUMENTS 5,978,475 A * 11/1999 Schneier ............. G06F 21/6209
                                                    713/177
7,865,931 B1 * 1/2011 Stone ...................... G06F 21/31
                                                     726/17

(Continued)

FOREIGN PATENT DOCUMENTS

EP       2 317 690 A1      5/2011

OTHER PUBLICATIONS

Adi Shamir, How to share a secret, 1979, pp. 1-14.

*Primary Examiner* — Harunur Rashid
(74) *Attorney, Agent, or Firm* — Browdy and Neimark, PLLC

(57) ABSTRACT

There is provided a computerized method of secure communication between a source computer and a destination computer, the method performed by an inspection computer and comprising: receiving data sent by the source computer to the destination computer; inspecting the received data using one or more filtering mechanisms, giving rise to one or more inspection results; separately signing each of the one or more inspection results; determining, based on an inspection management policy, whether to send at least some of the inspection results and/or derivatives thereof for manual inspection; upon a positive determination, providing manual inspection of the at least some inspection results and/or derivatives thereof, and providing signing of the at (Continued)

least one manual inspection result; and analyzing signed inspection results and performing additional verification of the signed inspection results when a result of the analyzing meets a predefined criterion specified by the inspection management policy.

19 Claims, 3 Drawing Sheets

(51) Int. Cl.
*H04L 9/32* (2006.01)
*H04L 9/00* (2022.01)

(58) Field of Classification Search
CPC ............. H04L 63/1425; H04L 63/0227; H04L 63/0471; H04L 63/20; G06F 21/565; G06F 21/645
See application file for complete search history.

(56) References Cited

U.S. PATENT DOCUMENTS

| | | | | |
|---|---|---|---|---|
| 2007/0244974 | A1* | 10/2007 | Chasin | H04L 51/234 709/206 |
| 2009/0044264 | A1* | 2/2009 | Ramanathan | H04L 63/08 713/186 |
| 2016/0275303 | A1* | 9/2016 | Narayanaswamy | H04L 9/0869 |
| 2018/0097829 | A1* | 4/2018 | Muttik | G06F 21/6245 |

* cited by examiner

METHOD OF SECURE COMMUNICATION AND SYSTEM THEREOF

TECHNICAL FIELD

The presently disclosed subject matter relates, in general, to the field of data communication, and more specifically, to secure communication between a source computer and a destination computer.

BACKGROUND

In the modern information era, vast amounts of data with personal information and institutional information permeate networks across the world. However, information security violation and attacks on computer devices and computer networks keep rising at an alarming rate, with increased sophistication, causing undesired data breaches and potential risks/damages to organizational assets.

The security industry has made rapid progress in data security products, both in terms of novelty, efficiency, feature set and overall approach to security. Certain techniques and measures are currently used for ensuring data security and integrity, is such as, e.g., installing antivirus software, use of firewalls, establishment of data protection policies, data classification, and identity and access management, etc.

However, there is still a need for secure data corm urtication for ensuring and preserving data security and integrity.

GENERAL DESCRIPTION

In accordance with certain aspects of the presently disclosed subject matter, there is provided a computerized method of secure communication between a source computer and a destination computer, the method comprising: upon operatively connecting the source computer and the destination computer with an inspection computer, receiving, by the inspection computer, data sent by the source computer to the destination computer; inspecting, by the inspection computer, the received data using one or more filtering mechanisms, giving rise to one or more inspection results each corresponding to a respective filtering mechanism, each inspection result indicative of an inspected status of the received data; separately signing, by the inspection computer, each of the one or more inspection results, giving rise to one or more signed inspection results; determining, by the inspection computer and based on an inspection management policy, whether to send at least some of the inspection results and/or derivatives thereof for manual inspection, wherein the inspection management policy is specified with respect to one or more attributes associated with the received data; upon a positive determination, providing manual inspection of the at least some inspection results and/or derivatives thereof sent by the inspection computer, giving rise to at least one manual inspection result indicative of an approval status, and providing signing of the at least one manual inspection result, giving rise to at least one signed manual inspection result; and analyzing, by the inspection computer, signed inspection results including at least one of i) the one or more signed inspection results, and ii) the at least one signed manual inspection result, and performing additional verification of the signed inspection results when the result of the analyzing meets a predefined criterion specified by the inspection management policy, wherein the additional verification determines whether to send inspected data corresponding to the received data to the destination computer.

In addition to the above features, the method according to this aspect of the presently disclosed subject matter can comprise one or more of features (i) to (xiii) listed below, in any desired combination or permutation which is technically possible:

(i). The inspection computer can comprise one or more inspectors configured with the one or more filtering mechanisms and associated with one or more secure signing mechanisms. The received data can be separately inspected by each inspector using a respective filtering mechanism thereof and each of the one or more inspection results can be separately signed by a corresponding inspector using a respective secure signing mechanism thereof.

(ii). The one or more filtering mechanisms can be selected from a group of filtering mechanisms comprising malware detection, data leak prevention, expression recognition, format conversion, redacting modification and data filtration.

(iii). The selection can be based on the inspection management policy and the received data.

(iv). At least one of the inspection results can include an inspected status of the received data and inspected data corresponding to the received data.

(v). The manual inspection can be performed by at least one manual inspector each associated with a secure signing mechanism, and the signing of the at least one manual inspection result can be performed separately by each of the at least one manual inspector, using the secure signing mechanism associated therewith.

(vi). At least some of i) the secure signing mechanisms associated with the one or more inspectors, and ii) the secure signing mechanism associated with each of the at least one manual inspector, can be cryptographic signing executed in a secure environment.

(vii). The cryptographic signing can be executed in a designated secure enclave of a protected memory region.

(viii). Each of the one or more inspectors and the at least one manual inspector can have a respective secure enclave designated thereto, and have a secure signing mechanism associated therewith which is cryptographic signing executed in the designated secure enclave.

(ix). One or more attributes associated with the received data can be selected from a group comprising: one or more attributes of the received data, one or more attributes of the source computer that sends the data, and one or more attributes of an environment in which the data is sent.

(x). The method can further comprise aggregating, by the inspection computer, the one or more inspection results to an aggregated inspection result and determining whether to send the aggregated inspection result for manual inspection. The manual inspection can be performed on the aggregated inspection result.

(xi). The predefined criterion can be based on a sum of weighted signed inspection results as specified in the inspection management policy.

(xii). The additional verification can comprise verifying completeness and accuracy of the one or more signed inspection results and/or the at least one signed manual inspection result.

(xiii). The inspection management policy can include a list of predefined orders of the one or more inspectors, and the received data can be inspected and signed by the one or more inspectors in one of the list of predefined orders, such that each inspector, except for the first inspector, signs on a content including the received data and one or more signatures of one or more preceding inspectors that previously performed the signing, giving rise to a chain of signatures, and the additional verification can comprise verifying completeness and accuracy of each signature in the chain of signatures, and whether an order of the chain of signatures belongs to the list of predefined orders.

In accordance with other aspects of the presently disclosed subject matter, there is provided an inspection computer operatively connected with the source computer and the destination computer with an inspection computer, the inspection computer configured to: receive data sent by the source computer to the destination computer; inspect the received data using one or more filtering mechanisms, giving rise to one or more inspection results each corresponding to a respective filtering mechanism, each inspection result indicative of an inspected status of the received data; separately sign each of the one or more inspection results, giving rise to one or more signed inspection results; determine, based on an inspection management policy, whether to send at least some of the inspection results and/or derivatives thereof for manual inspection, wherein the inspection management policy is specified with respect to one or more attributes associated with the received data; upon a positive determination, provide manual inspection of the at least some inspection results and/or derivatives thereof sent by the inspection computer, giving rise to at least one manual inspection result indicative of an approval status, and provide signing of the at least one manual inspection result, giving rise to at least one signed manual inspection result; and analyze, by the inspection computer, signed inspection results including at least one of i) the one or more signed inspection results, and ii) the at least one signed manual inspection result, and perform additional verification of the signed inspection results when result of the analyzing meets a predefined criterion specified by the inspection management policy, wherein the additional verification determines whether to send inspected data, corresponding to the received data, to the destination computer.

This aspect of the disclosed subject matter can comprise one or more of features (i) to (xiii) listed above with respect to the method, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform a method of secure communication between a source computer and a destination computer, the method comprising: upon operatively connecting the source computer and the destination computer with an inspection computer, receiving, by the inspection computer, data sent by the source computer to the destination computer; inspecting, by the inspection computer, the received data using one or more filtering mechanisms, giving rise to one or more inspection results each corresponding to a respective filtering mechanism, each inspection result indicative of an inspected status of the received data; separately signing, by the inspection computer, each of the one or more inspection results, giving rise to one or more signed inspection results; determining, by the inspection computer and based on an inspection management policy, whether to send at least some of the inspection results and/or derivatives thereof for manual inspection, wherein the inspection management policy is specified with respect to one or more attributes associated with the received data; upon a positive determination, providing manual inspection of the at least some inspection results and/or derivatives thereof sent by the inspection computer, giving rise to at least one manual inspection result indicative of an approval status, and providing signing of the at least one manual inspection result, giving rise to at least one signed manual inspection result; and analyzing, by the inspection computer, signed inspection results including at least one of i) the one or more signed inspection results, and ii) the at least one signed manual inspection result, and performing additional verification of the signed inspection results when result of the analyzing meets a predefined criterion specified by the inspection management policy, wherein the additional verification determines whether to send inspected data corresponding to the received data to the destination computer.

This aspect of the disclosed subject matter can comprise one or more of features (i) to (xiii) listed above with respect to the method, mutatis mutandis in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
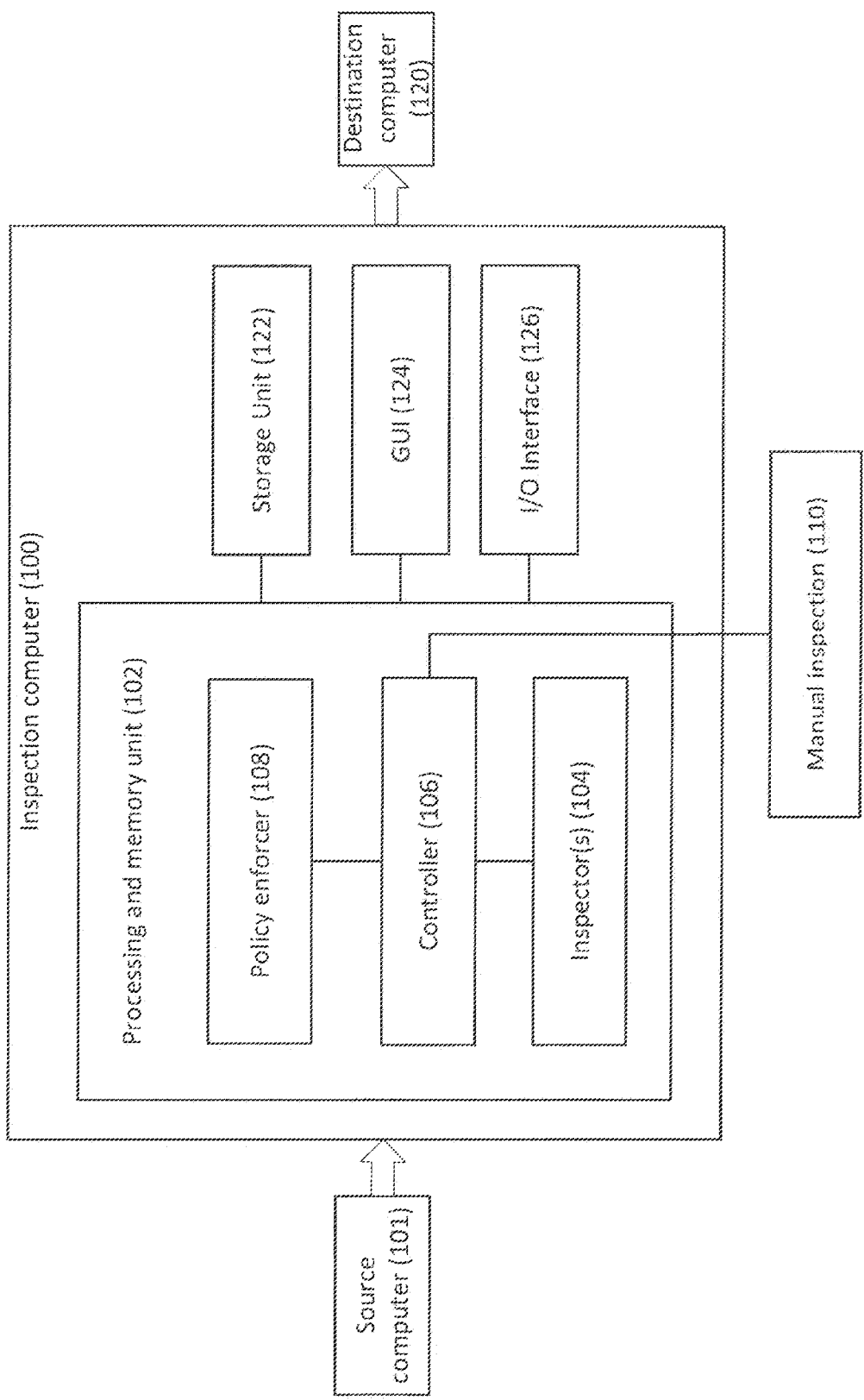
FIG. 1 illustrates a schematic block diagram of an inspection computer system in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "connecting", "sending", "inspecting", "filtering", "signing", "determining", "providing", "analyzing", "performing", "verifying", "aggregating", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the inspection computer and parts thereof, as well as the processing and memory unit and processor comprised therein as disclosed in the present application.

The terms "non-transitory memory" and "non-transitory storage medium" used herein should be expansively construed to cover any volatile or non-volatile computer memory suitable to the presently disclosed subject matter.

Embodiments of the presently disclosed subject matter are not described with reference to any particular programming language, it will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described, in the context of separate embodiments, can also be provided in combination in a single embodiment. Conversely, various features of the presently disclosed subject matter, which are described in the context of a single embodiment, can also be provided, separately or in any suitable sub-combination. In the following detailed description, numerous specific details are set forth in order to provide a thorough understanding of the methods and apparatus.

Bearing this in mind, attention is drawn to FIG. 1 illustrating a schematic block diagram of an inspection computer system in accordance with certain embodiments of the presently disclosed subject matter.

The system 100 illustrated in FIG. 1 refers to an inspection computer operatively connected to a source computer 101 and a destination computer 120. The inspection computer can be used for ensuring secure data communication between the source computer 101 and the destination computer 120. According to certain embodiments, the source computer refers to a requesting computerized entity that initializes data transmission to the destination computer, and the destination computer refers to a receiving computerized entity that receives the transmitted data.

It is to be noted that the source computer and destination computer can refer to any computerized entities that can connect and communicate with each other in any suitable data communication schemes and structures, and the present disclosure is not limited to a specific type, structure, and/or functionality/role, of each entity. In some embodiments, the source computer and destination computer can work in a client-server communication architecture. By way of example, the source computer can refer to a client who initializes a request to import information to the destination computer which acts as the server. By way of another example, the source computer can refer to the server which provides or exports information to the destination computer, which accordingly acts as the client. One illustrative example in such cases can be a local-remote connection scheme. For instance, an organization such as, e.g., an insurance company, may allow for remote users/agents to connect to its internal system and get insurance quotes. However, measures should be taken to prevent the remote users from exfiltrating any company valuable information and/or introducing any malware to the internal systems. Thus, the inspection computer system as proposed herein can be utilized for ensuring secure communication for the client-server path and/or the server-client path. Details of these aspects are further described below with reference to FIG. 3.

As illustrated, system 100 can comprise a processing and memory unit (PMU, also termed as processing unit) 102 operatively connected to a hardware-based I/O interface 126 and a storage unit 122. PMU 102 is configured to provide all processing necessary for operating system 100 as further detailed below with reference to FIG. 2. PMU 102 comprises a processor (not shown separately) and a memory (not shown separately). The processor of PMU 102 can be configured to execute several functional modules in accordance with computer-readable instructions implemented on a non-transitory computer-readable memory comprised in the PMU. Such functional modules are referred to hereinafter as comprised in the PMU. It is to be noted that the term processor referred to herein should be expansively construed to cover any processing circuitry with data processing capabilities, and the present disclosure is not limited to the type or platform thereof, or number of processing cores comprised therein.

Functional modules comprised in the PMU 102 can comprise one or more inspectors 104, a policy enforcer 108, and a controller 106 which is operatively connected with the inspectors and the policy enforcer. Upon receiving, by the PMU via the I/O interface 126, data sent by the source computer 101 to the destination computer 120, the one or more inspectors 104 can be configured to inspect the received data using one or more filtering mechanisms, giving rise to one or more inspection results each corresponding to a respective filtering mechanism. Each of the inspection results can be indicative of an inspected status of the received data. The one or more inspectors 104 can be further configured to separately sign each of the one or more inspection results, giving rise to one or more signed inspection results. The controller 106 can be configured to determine, based on an inspection management policy, whether to send at least some of the inspection results and/or derivatives thereof for manual inspection. The inspection management policy can be specified with respect to one or more attributes associated with the received data. It is to be noted that the one or more inspectors referred herein are computerized functional modules comprised in the PMU, as compared to the manual inspector which is further described below.

Upon a positive determination (i.e., the controller determines a manual inspection is needed), the manual inspection module 110 can be configured to provide manual inspection of the at least some inspection results and/or derivatives thereof sent by the inspection computer (e.g., the controller 106), giving rise to at least one manual inspection result indicative of an approval status, and provide signing of the at least one manual inspection result, giving rise to at least one signed manual inspection result. The controller 106 can be further configured to analyze signed inspection results including, including at least one of i) the one or more signed inspection results, and ii) the at least one signed manual inspection result, and perform additional verification of the signed inspection results when result of the analyzing meets a predefined criterion specified by the inspection management policy. The additional verification can determine whether to send inspected data corresponding to the received data to the destination computer (e.g., via the I/O interface 126).

According to certain embodiments, system 100 can comprise a storage unit 122. The storage unit 122 can be configured to store any data necessary for operating system 100, e.g., data related to input and output of system 100, as well as intermediate processing results generated by system 100. By way of example, the storage unit 122 can be configured to store data received from the source computer 101, inspection result(s), inspected data, manual inspection result, and signed inspection result, etc.

In some embodiments, system 100 can optionally comprise a computer-based Graphical user interface (GUI) 124 which is configured to enable user-specified inputs and/or outputs related to system 100. For instance, the user may view the received data, and/or some of the inspection results on the GUI, Optionally, the user may be provided, through the GUI, with options of defining certain operation parameters of system 100.

Those versed in the art will readily appreciate that the teachings of the presently disclosed subject matter are not bound by the system illustrated in equivalent and/or modified functionality can be consolidated or divided in another manner and can be implemented in any appropriate combination of software with firmware and hardware.

It is noted that the system illustrated in FIG. 1 can be implemented in a distributed computing environment, in which one or more of the aforementioned functional modules shown in FIG. 1, such as the one or more inspectors 104 or some thereof, the policy enforcer 108, and the controller 106, can be distributed over several local and/or remote devices, and can be linked through a communication network. It is further noted that although the storage unit 122 and GUI 124 are illustrated as being part of the system 100 in FIG. 1, in some other embodiments, at least some of the aforementioned units can be implemented as being external to system 100 and can be configured to operate in data communication with system 100 via I/O interface 126.

It is also be noted that in some cases the inspection computer can be implemented as stand-alone computer(s) and can be operatively connected to the source computer and destination computer to operate in conjunction therewith (as exemplarily illustrated in FIG. 1). In some other cases, the inspection computer, or at least part of the functionality thereof, can be integrated with the source computer and/or the destination computer thereby facilitating and enhancing the functionalities thereof. In such cases, components of the system 100, or at least part thereof, may part of the source computer and/or the destination computer.

Figure 2:
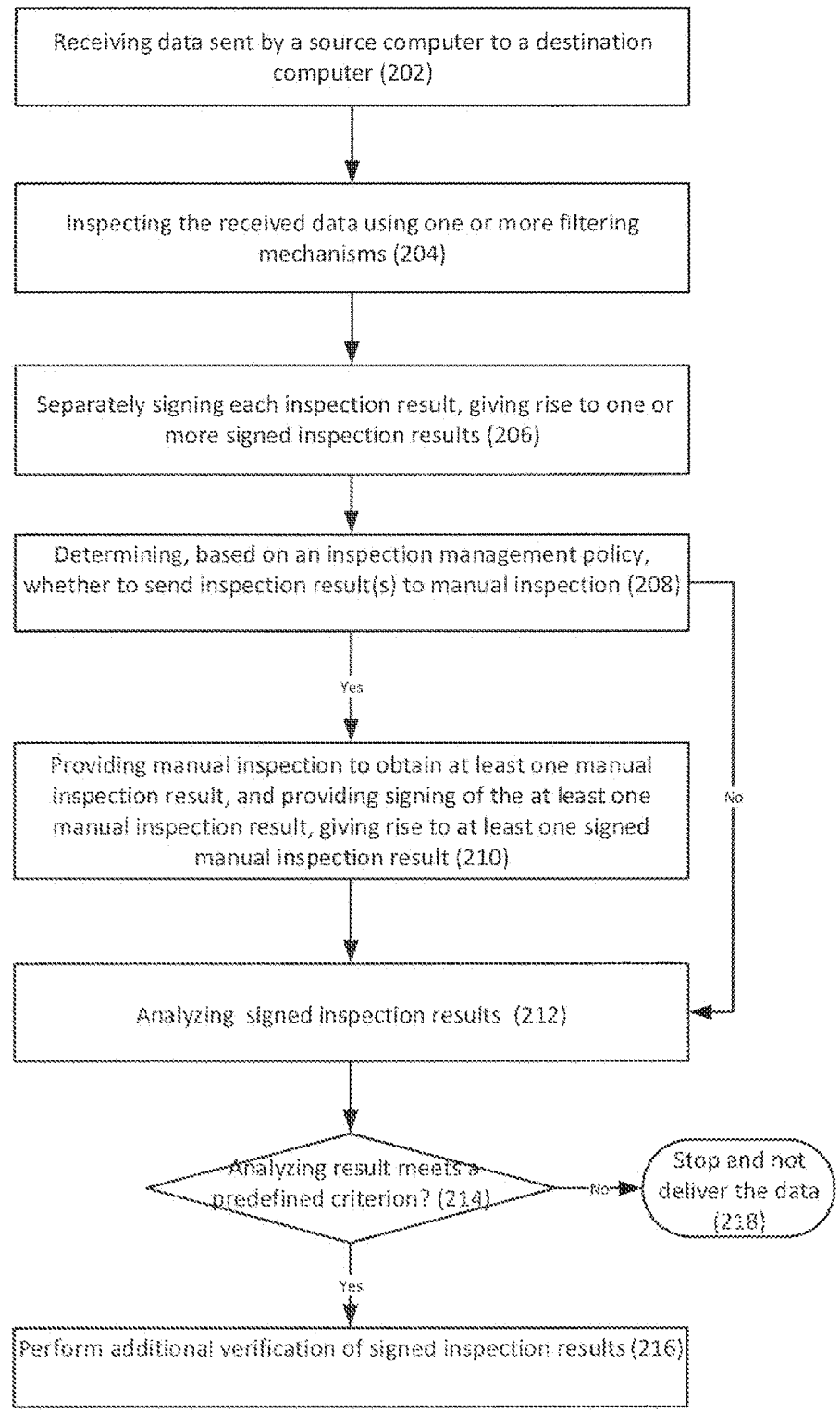
FIG. 2 illustrates a generalized flowchart of secure communication between a source computer and a destination computer in accordance with certain embodiments of the presently disclosed subject matter.

Reference is now made to FIG. 2, illustrating a generalized flowchart of secure communication between a source computer and a destination computer in accordance with certain embodiments of the presently disclosed subject matter.

Upon operatively connecting the source computer and the destination computer with an inspection computer (e.g., the inspection computer 100 as illustrated in FIG. 1), data is received (202), by the inspection computer (e.g., by the PMU 102 via the I/O interface 126), the data being sent by the source computer to the destination computer through the inspection computer.

As aforementioned, the source computer and destination computer can refer to any computerized entities that can connect and communicate with each other in any suitable data communication schemes and structures. The data sent by the source computer, as referred to herein, can include any type of data indicative of specific information which can be represented in any suitable formats and/or structures. By way of example, in some cases, the data can be represented in a file format with different possible file types, such as, e.g., image files, text files, audio and/or video files, etc., of which the specific formats can be determined by specific programs associated with these files. However, the present disclosure is not limited by a specific type of representation thereof. In addition, any data being sent not associated with a typical file format, such as, e.g., an instant message, should also be construed to be covered by the present disclosure.

It is to be noted that in some cases, the inspection computer may perform the inspection of received data by default without the source computer and destination computer being aware of such inspection, and in some other cases, the inspection computer may perform the inspection upon receiving a specific request from the source computer for inspecting the received data, According to certain embodiments, in some cases, the source computer may need to be authenticated and health-checked (e.g., by the inspection computer), before being allowed to proceed, with other operations as described below.

The received data can be inspected (204), by the inspection computer, using one or more filtering mechanisms, giving rise to one or more inspection results each corresponding to a respective filtering mechanism. Each of the one or more inspection results can be separately signed (206), by the inspection computer, giving rise to one or more signed inspection results. According to certain embodiments, the inspection computer can comprise one or more inspectors the one or more inspectors 104 as comprised in the PMU illustrated, in FIG. 1). The one or more inspectors can be respectively configured with the one or more filtering mechanisms and associated with one or more secure signing mechanisms. The received data can be separately inspected by each inspector using a respective filtering mechanism thereof. Each of the inspection results can be separately signed by a corresponding inspector using a respective secure signing mechanism thereof.

It is to be noted that although the terms "filtering" and "filtering mechanism(s)" are used herein, they should not be construed as being limited to merely removing unwanted features or components from the received data, but rather intend to cover any suitable inspection mechanism that can be used to validate the received data. According to certain embodiments, the one or more filtering mechanisms of the one or more inspectors can be selected from a group of filtering mechanisms comprising malware detection, data leak prevention, expression recognition, format conversion, redacting modification and data cleansing. An illustrative description of these filtering mechanisms is given herein for exemplary purposes only and does not intend to limit the present disclosure in any way. Malware detection can refer to searching for malicious code embedded in the received data, such as, e.g., those mechanisms used in anti-virus software. Data leak prevention can refer to verifying and preventing valuable information from being exfiltrated, Expression recognition can refer to a regular expression engine which allows one to detect data that matches specified regular expressions/patterns. Format conversion can refer to converting the format of the received data from one to another for security purposes, such as, e.g., converting Microsoft Word to PDF or to an image format. Redacting modification can refer to modifying data sent from the source computer automatically, e.g., for purpose of redacting the data (e.g., editing the data for censoring or obscuring certain content for security purposes). Data cleansing can refer to detecting and correcting (or removing) any components that are not required and might be used for transmitting unwanted data, by way of, e.g., deconstructing the data into components and rebuilding it.

According certain embodiments, the selection of the one or more filtering mechanisms or the one or more inspectors to be used for a given received data can be performed (e.g., by the controller 106 as illustrated in FIG. 1) based on an inspection management policy and the given received data. The inspection management policy used herein can refer to a set of inspection rules and configurations that the inspection computer (in particular, the controller) is configured with for performing inspection of the received data. The inspection management policy is specifically determined with respect to each received data to be inspected, as detailed below with reference to block 208.

Each inspection result from a corresponding inspector can be indicative of an inspected status of the received data. In some embodiments, at least one of the inspection results can include an inspected status of the received data and inspected data corresponding to the received data. In accordance with different filtering mechanisms and received, data, there can be various types of inspected statuses. By way of example, one type of inspected status can be that no issue was uncovered, which provides a positive indication of the data being benign. Another type of inspected status can be that one or more issues were uncovered, together with descriptive information associated with the uncovered issues. In such cases, there can be further sub-categories, such as, no cleaning was performed so that the uncovered issue(s) still exists, or the uncovered issue(s) was treated/cleared up by the inspector, therefore no longer exists. A further type of inspected status can be that certain modification was performed on the received data, resulting in inspected data which is a modified version of the received data. Other possible types of inspected statuses can include (hut are not limited to): data cannot be processed, error reading data, internal error in filter, insufficient resources for performing filtering, etc.

As aforementioned, the one or more inspectors can be respectively associated with one or more secure signing mechanisms. The term "signing" or "signing mechanism" used herein refers to a computing scheme used to provide a digital signature for presenting the authenticity and integrity of digital data such as messages or documents. A valid digital signature can give a recipient reason to believe that the transmitted message was created by the claimed sender (i.e., authentication), and that the message was not altered in transit (i.e., integrity), thus can be used to detect forgery and/or tampering. The secure signing mechanisms associated with the one or more inspectors are cryptographically based. Digital signing or digital signatures in general employ asymmetric cryptography (e.g., Public-key cryptography). A signing mechanism or signing scheme allows a sender that owns a key pair of public key and private key to be able to sign data using the private key, and enables the receiver to verify the signed data (including the signature together with the data) using the corresponding public key. One example of a possible signing mechanism can be based on an RSA algorithm.

In order to secure the signing, measures should be taken to keep the private key secret, since anyone having access to the private key can forge the owner's signature. One example of providing a secure environment for preserving the key is by using a physical carrier. The physical carrier is a piece of hardware (such as, e.g., a USB dangle/adaptor, etc.) that stores the private key, and, only when being connected to a device, can enable the device to perform the signing using the private key. Therefore, one needs to physically have the dongle in order to sign the data, which provides another layer of protection for the secure signing mechanism. In certain embodiments, the physical carrier can be coded and in some cases have its own processor for providing the additional functionality of protection.

Another example of providing a secure environment is by using a secure enclave. A secure enclave (also referred to herein as SE or enclave) is a trusted execution environment embedded in an application or process which provides a secure region (e.g., separated and encrypted) for the application to execute code and store data inside. The secure enclave can be executed from a protected memory region in which data is to be protected using access control mechanisms to be provided by the processor associated with secure enclave instructions.

By way of example, the secure enclave is implemented by Intel as Software Guard Extensions (SGX). SGX is a new mode of execution on the processor with corresponding memory protection semantic and instructions to be used for management. SGX can create secure enclaves by filling protected memory pages with desired code and data, locking the code and data in the enclaves, and performing measurement therein. The processor can execute the code inside the enclave. No other entities, including the kernel (ring 0), hypervisor (ring "−1"), SMM (ring "−2"), or AMT (ring "−3"), have the right to read or write the memory pages belonging to the enclave.

By way of another example, the secure enclave, or similar data security and access control mechanisms (which may be termed differently), are also implemented by other platforms and/or vendor's technologies, such as, e.g., Secure Encrypted Virtualization (SEV) by AMD and TrustZone by ARM, etc.

For purpose of illustration only, certain embodiments of the following description are provided with respect to the terms secure enclave(s) and SGX. Embodiments are, likewise, applicable to other similar data security and access control mechanisms implemented in different platforms and/or technologies as exemplified above.

According to certain embodiments, the secure enclave as described above can be used as a secure environment for preserving the private key and/or for executing the signing using the key, therefore providing additional security protection to the key and/or the execution of the signing which no other entities have right to access regardless of current privilege level and CPU mode, even if the device has been compromised. This is due to the fact that when an enclave is entered, an access control mechanism ensures that enclave memory pages belonging to the enclave cannot be read or written from outside the enclave.

According to certain embodiments of the present disclosure, each of the one or more inspectors (or at least some thereof) can have a respective secure enclave designated thereto which provides a secure environment for the inspector to execute code and store data therein. Accordingly, each inspector can securely protect its own code and data using the designated enclave which is not accessible to any other entity. For instance, each inspector can choose to protect its private key, and/or execution of the signing in the designated enclave. In some cases, it may be determined that the entire inspection functionality associated with the inspector can be executed in the designated enclave thereof (i.e., the inspector is in fact running in the enclave).

Continuing with the description of FIG. 2, once the one or more inspection results are separately signed by the one or more inspectors, and the one or more signed inspection results are obtained, it can be determined (208) (e.g., by the controller 106), based on the inspection management policy, whether to send at least some of the inspection results and/or derivatives thereof for manual inspection.

As aforementioned, the inspection management policy is specifically determined with respect to each received data to be inspected. For each received data, the policy can be specified with respect to one or more attributes associated therewith, in some embodiments, the one or more attributes associated with the received data can be selected from a group comprising: one or more attributes of the received data, one or more attributes of the source computer that sends the data and one or more attributes of an environment in which the data is sent.

By way of example, the attributes of the received data can include type of the data and content of the data. The attributes of the source computer can comprise user (i.e., the personnel/position using the source computer) name, type of user, type of the source computer, type and version of the operating system thereof, version of trusted entity application/support installed if any, current health (e.g., any security alert in effect), recent history of inspection, physical location and IP address thereof, etc. The attributes of the environment can comprise date and/or time of receiving the data, and number and type of inspected statuses returned from the inspectors, etc.

According to certain embodiments, the inspection management policy can include one or more predefined criteria which are based on one or more of the above listed attributes. At least some of the predefined criteria can be used for determining whether there is a need for manual inspection of any of the inspection results or derivatives thereof. By way of example, an Excel file received from a user of a salesperson contains a Visual Basic for Applications (VBA) macro, that only one of the inspectors is able to decide whether is benign or not. Based on the type of the file, the content of the file, as well as the number of inspected statuses returned (i.e., the number of inspectors that can perform the inspection), it can be determined whether or not the file needs to be sent on for manual inspection. By way of another example, an AutoCAD file is received from an administrative assistant, Since this type of position does not usually entail handling this type of file, it is decided, based on the type of the file and the type of user, that the file needs to be sent on for manual inspection. By way of further example, a spreadsheet file is received from a user who is a CFO, All of the inspectors (and at least two) determine that it is benign, and none determines that t is malicious. It can be decided, based on the type of the file and the type of user, that the file can be automatically sent on (e.g., to the policy enforcer) without manual inspection.

As aforementioned, in some cases, an inspection result can include an inspected status of the received data and inspected data corresponding to the received data. Depending on specific cases, the controller can decide what exactly to be sent on for manual inspection. In some embodiments, it may be decided that manual inspection is needed only for some of the inspection results (e.g., selected inspection result(s) of some specific inspector(s)). For each of those selected inspection results, one or more of the following derivatives thereof can be determined to be sent on for manual inspection: the inspected, data, the inspected status, the originally received data, and the signed inspection result. For instance, in the above examples of received data being an Excel file or AutoCAD file, the original file, the inspected file together with an inspected status can be sent on for manual inspection. In another example, when the received data has been filtered/cleansed/modified upon inspection by one of the inspectors, the inspected data corresponding to the received data can be a filtered/modified version of the received data. The controller can determine to send the inspected data for manual inspection for approval of the modification.

In some embodiments, optionally, the one or more inspection results, or at least some thereof (e.g., the selected inspection results), can be aggregated by the controller) to an aggregated inspection result, and the aggregated inspection result, as a derivative of the inspection results, can be sent on for manual inspection. By way of example, in some cases, the aggregated inspection result can include an aggregated inspected status generated based on the one or more inspected statuses, together with the original received data. In some other cases, it can include the aggregated inspected status together with the inspected data as inspected by at least one of the inspectors.

Upon a positive determination at block 208, manual inspection of the at least some of inspection results and/or derivatives thereof sent by the inspection computer (e.g., by the controller) can be provided (210) by the manual inspection module 110), giving rise to at least one manual inspection result indicative of an approval status. In addition, signing of the at least one manual inspection result can be provided (210) (e.g., by the manual inspection module 110 to the controller 106), giving rise to at least one signed manual inspection result. According to certain embodiments, the manual inspection can be performed by at least one manual inspector each associated with a secure signing mechanism, and the signing of the at least one manual inspection result can be performed separately by each of the at least one manual inspectors, using the secure signing mechanism associated therewith. The term manual inspector used herein refers to a person, as an approver (equipped with a computer device), who, upon receiving inspection results and/or derivatives from the inspection computer, performs additional inspection/verification in order to determine whether or not to approve the received information. The manual inspection module 110 referred to therein should be construed to include at least one computer device (or a dedicated inspection module of the computer device) operated by the at least one manual inspector for performing the additional inspection/verification.

The signing mechanisms used by the at least one manual inspector can be implemented in a similar manner as described above with reference to the signing mechanisms associated with the one or more inspectors (as described with reference to block 206 above). In particular, in some embodiments of the present disclosure, the secure signing mechanism associated with each of the at least one manual inspector (or with at least some of the at least one manual inspectors) is cryptographic signing executed in a secure environment. By way of example, each of the at least one manual inspector (or at least some thereof) can be equipped with a computer device which comprises a dedicated inspection module for performing the manual inspection process. The inspection module has a respective secure enclave designated thereto which provides a secure environment for the inspection module to execute code and store data therein. For instance, the inspection module can choose to protect its private key, and/or the execution of the signing in the designated enclave. In some cases, it may be determined that the entire manual inspection process associated with the inspection module can be executed in the designated enclave thereof.

For illustrative purposes, there is now described a non-limiting example demonstrating the manual inspection process. A CFO of a company can act as an approver using his/her designated computer device. The computer device is specifically configured with an inspection functionality implemented in an inspection module thereof. Upon the CFO verifying the inspection results as received from the inspection computer, and providing his/her manual inspection results, he/she can sign the manual inspection result which is performed in a secure enclave designated to the inspection module, so that no other entities can access the signing, in particular the private key used for signing. The signed manual inspection result can be provided to the controller of the inspection computer for making further decisions.

In some embodiments, a manual inspection result can be indicative of an approval status (i.e., whether the received at least part of inspection results and/or derivatives thereof sent by the inspection computer are approved or not), Optionally, the manual inspection result can also include manual inspected data if the manual inspector performs certain modifications of the data upon inspection.

Continuing with the description of FIG. 2, signed inspection results can be analyzed (212) by the inspection computer (e.g., by the controller 106). The signed inspection results can include at least one of: i) the one or more signed inspection results, and ii) the at least one signed manual inspection result. In some embodiments, when it is determined in block 208 that there is no need for manual inspection, the signed inspection results here can only include the one or more signed inspection results as provided by the one or more inspectors. In some other embodiments, when it is determined in block 208 that there is a need for manual inspection (i.e., positive determination as mentioned above) and once the at least one signed manual inspection result is provided by the manual inspection module to the controller, the signed inspection results here can include either the at least one signed manual inspection result, or both the one or more signed inspection results as provided by the one or more inspectors, and the at least one signed manual inspection result.

According to certain embodiments, the analyzing can be based on a predefined criterion as specified by the inspection management policy. In some cases, the one or more inspectors and/or the at least one manual inspector may be assigned with respective weight factors, and the signed inspection results can be analyzed/evaluated by the controller by applying the weight factors on corresponding inspection results, giving rise to a weighted sum/total (i.e., a sum of weighted signed inspection results). By way of example, the predefined criterion can be based on the number of signed inspection results (e.g., based on the signatures included in the signed inspection results) that are indicative of approval, or a sum of weighted signed inspection results that are indicative of approval, or a combination thereof. To continue with the previous examples, when the AutoCAD file was sent on for manual inspection, a predefined criterion can be that at least two signatures of manual inspectors indicative of approval should be obtained, or at least two signatures indicative of approval with a total weight of 5 should be obtained. For instance, the file can be sent to multiple manual inspectors who are assigned with different weights according to their positions/responsibilities in the organization, e.g., a CEO may be assigned with a weight of 4, a division manager may be assigned with a weight of 2, whereas a technical engineer and a salesperson may be assigned with a weight of 1, etc. In this case, the predefined criterion can be regarded as being met if two signatures indicative of approval are received with a weight of 5, for instance, receiving the signatures of a CEO and a technical engineer. When the Excel file is sent on for manual inspection, a predefined criterion can be that at least three signatures indicative of approval with a total weight of 7 should be obtained, and, in addition, at least one of the three signatures is from the technical department. In another example, in the case that no manual inspection is performed, the predefined criterion can be that the inspection results from all of the one or more inspectors give a positive indication of the data being benign.

When a result of the analyzing meets (214) the predefined criterion, additional verification of the signed inspection results can be performed (216) by the inspection computer by the policy enforcer 108). The additional verification can determine whether to send inspected data corresponding to the received data to the destination computer. In some embodiments, the additional verification can comprise verifying completeness and accuracy of the one or more signed inspection results and/or the at least one signed manual inspection result. The policy enforcer is configured to receive all the signed inspection results from the controller and make a final decision as to whether the data should be sent to the destination computer, thereby providing an additional layer of protection besides the controller (i.e., providing redundancy and increasing reliability of the system). The policy enforcer verifies whether all of the one or more inspectors and/or the at least one manual inspector have executed the inspection (i.e., completeness), and whether their signatures are correct (i.e., accuracy).

On the other hand, when a result of the analyzing does not meet (214) the predefined criterion, additional verification of the signed inspection results does not need to be performed. The inspection process can stop (218) and it can be determined that the data will not be sent to the destination computer.

According to certain embodiments, instead of each of the one or more inspectors signing their respective inspection results separately, the controller may maintain a "chain of signatures" mechanism (as specified in the inspection management policy), in which each inspector signs a content including a signature of previous executed inspectors. Specifically, the inspection management policy can include a list of predefined orders of the one or more inspectors, and the received data can be inspected and signed by the one or more inspectors in one of the list of predefined orders such that each inspector, except for the first inspector, signs on a content including the received data and one or more signatures of one or more preceding inspectors that previously performed the signing, giving rise to a chain of signatures. In such cases, the additional verification can comprise verifying completeness and accuracy of each signature in the chain of signatures, and, in addition, verifying whether an order of the chain of signatures belongs to the list of predefined orders. This can effectively prevent a situation when a takeover of the controller by a malicious party may allow problematic data to pass through.

According to certain embodiments, the controller can also be configured to verify the signatures of the inspectors in a similar manner as described above with reference to the policy enforcer, so as to facilitate analyzing the inspection results according to the inspection management policy. In some cases, the controller may be configured to verify/examine if the inspectors are working correctly, in an attempt to detect whether the inspectors are compromised (e.g., some of the inspectors may be attacked by an attacker who would always return a bad response). One example of such verification can be probing the inspectors. The terms "probe" or "probing" refers to an action taken or a service used for the purpose of collecting data, and/or monitoring state or activity of an entity.

It is to be noted that, as aforementioned, each of the aforementioned functional modules (or at least some thereof), such as the one or more, inspectors 104 or some thereof, the policy enforcer 108, and the controller 106, can be implemented in separate devices distributed over local and/or remote entities, and can be operatively connected to each other through a communication network. In addition, each of these modules can have a respective secure enclave designated thereto for storing the private key and/or executing the signing process and/or performing verification etc. In some cases, the entire functionality of a module can be executed in the designated enclave thereof (i.e., the module is deemed as running in the enclave).

Figure 3:
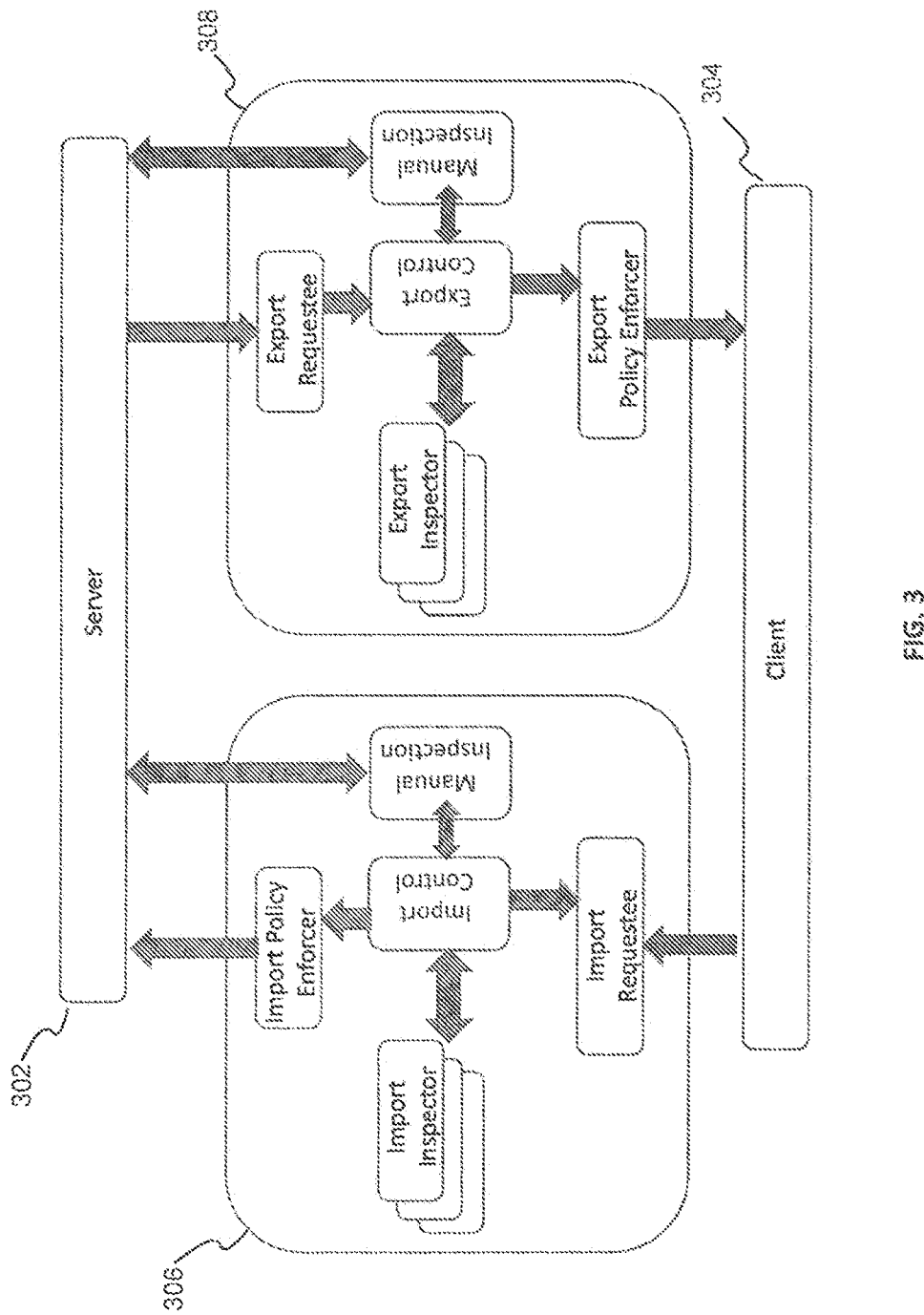
FIG. 3 is a schematic illustration of ensuring secure communication for a client-server path and a server-client path in the client-server communication architecture in accordance with certain embodiments of the presently disclosed subject matter.

Turning now to FIG. 3, there is shown a schematic illustration of ensuring secure communication for a client-server path and a server-client path in the client-server communication architecture in accordance with certain embodiments of the presently disclosed subject matter.

As illustrated, a client 304 is communicating with a server 302 through a communication network. The client 304 may initialize a request to import information to the server 302 (therefore the client-server path is also referred to as the import path), and the server 302 may provide or export information to the client 304 (therefore the server-client path is also referred to as the export path). The inspection mechanism as proposed herein and described above with reference to FIG. 2 can be used to secure the communication on the import path and/or the export path, thereby providing secure import and/or secure export communication paths between the client and the server, Although the purpose of performing secure communication on the two paths may be different, e.g., secure import may aim to verify that the input information to the server is benign, while secure export may aim to verify and prevent valuable information from being exfiltrated, the inspection computer system and inspection mechanism as proposed herein can be similarly adapted to both paths. Specifically, the left diagram 306 in FIG. 3 shows a secure import inspection system. The import requestee serves as an interface to receive the inspection request from the client 304, and send the request to the import control (i.e., import controller, equivalent to the role of controller as described above). The import controller coordinates between the import inspectors, the manual inspection module, and the import policy enforcer, in a similar way as described above. The import enforcer, serving as the last layer of protection, determines whether to forward the data on to the server. Similarly, the right diagram 308 shows a secure export inspection system which is implemented in a similar manner. It is to be appreciated that due to different purposes of the two paths, the inspectors on either path may be associated with different filtering mechanisms, and the controller may be configured with different inspection management policies, for serving the specific purpose thereof.

It is to be noted that the examples shown in the figures and described above are only for illustrative purposes and should not be deemed to limit the present disclosure in any way. Anyone skilled in the art would readily appreciate that any other suitable implementations or illustrations can be used in addition to or in lieu of the illustrated examples.

It is also noted that whilst the flow charts illustrated in in FIG. 2 are described with reference to elements of system 100, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method of secure communication between a source computer and a destination computer, the method comprising:

upon operatively connecting the source computer and the destination computer with an inspection computer, receiving, by the inspection computer, data sent by the source computer to the destination computer;

inspecting, by the inspection computer, the received data using one or more filtering mechanisms, giving rise to one or more inspection results each corresponding to a respective filtering mechanism, each inspection result indicative of an inspected status of the received data;

separately signing, by the inspection computer, each of the one or more inspection results, giving rise to one or more signed inspection results;

determining, by the inspection computer and based on an inspection management policy, whether to send at least some of the inspection results and/or derivatives thereof for manual inspection, wherein the inspection management policy is specified with respect to one or more attributes associated with the received data;

upon a positive determination, providing manual inspection of the at least some inspection results and/or derivatives thereof sent by the inspection computer, giving rise to at least one manual inspection result indicative of an approval status, and providing signing of the at least one manual inspection result, giving rise to at least one signed manual inspection result; and analyzing, by the inspection computer, signed inspection results including at least one of i) the one or more signed inspection results, and ii) the at least one signed manual inspection result, and performing additional verification of the signed inspection results when a result of the analyzing meets a predefined criterion specified by the inspection management policy, wherein the additional verification determines whether to send inspected data corresponding to the received data to the destination computer;

wherein the inspection management policy includes a list of predefined orders of one or more inspectors comprised in the inspection computer, and the received data is inspected and signed by the one or more inspectors in one of the list of predefined orders, such that each inspector, except for a first inspector, signs on a content including the received data and one or more signatures of one or more preceding inspectors that previously performed the signing, giving rise to a chain of signatures, and wherein the additional verification comprises verifying completeness and accuracy of each signature in the chain of signatures, and whether an order of the chain of signatures belongs to the list of predefined orders.

2. The computerized method according to claim 1, wherein the inspection computer comprises the one or more inspectors configured with the one or more filtering mechanisms and associated with one or more secure signing mechanisms, and wherein the received data is separately inspected by each inspector using a respective filtering mechanism thereof and each of the one or more inspection results is separately signed by a corresponding inspector using a respective secure signing mechanism thereof.

3. The computerized method according to claim 2, wherein the manual inspection is performed by at least one manual inspector each associated with a secure signing mechanism, and the signing of the at least one manual inspection result is performed separately by each of the at least one manual inspectors using the secure signing mechanism associated therewith.

4. The computerized method according to claim 3, wherein at least some of i) the secure signing mechanisms associated with the one or more inspectors, and ii) the secure signing mechanism associated with each of the at least one manual inspector, is cryptographic signing executed in a secure environment.

5. The computerized method according to claim 4, wherein the cryptographic signing is executed in a designated secure enclave of a protected memory region.

6. The computerized method according to claim 4, wherein each of the one or more inspectors and the at least one manual inspector has a respective secure enclave designated thereto, and has a secure signing mechanism associated therewith which is cryptographic signing executed in the designated secure enclave.

7. The computerized method according to claim 1, wherein the one or more filtering mechanisms are selected from a group of filtering mechanisms comprising malware detection, data leak prevention, expression recognition, format conversion, redacting modification and data filtration.

8. The computerized method according to claim 1, wherein one or more attributes associated with the received data are selected from a group comprising: one or more attributes of the received data, one or more attributes of the source computer that sends the data, and one or more attributes of an environment in which the data is sent.

9. The computerized method according to claim 1, wherein the additional verification comprises verifying completeness and accuracy of the one or more signed inspection results and/or the at least one signed manual inspection result.

10. An inspection computer operatively connected with the source computer and the destination computer with an inspection computer, the inspection computer configured to:
receive data sent by the source computer to the destination computer; inspect the received data using one or more filtering mechanisms, giving rise to one or more inspection results each corresponding to a respective filtering mechanism, each inspection result indicative of an inspected status of the received data;
separately sign each of the one or more inspection results, giving rise to one or more signed inspection results;
determine, based on an inspection management policy, whether to send at least some of the inspection results and/or derivatives thereof for manual inspection, wherein the inspection management policy is specified with respect to one or more attributes associated with the received data;
upon a positive determination, provide manual inspection of the at least some inspection results and/or derivatives thereof sent by the inspection computer, giving rise to at least one manual inspection result indicative of an approval status, and provide signing of the at least one manual inspection result, giving rise to at least one signed manual inspection result; and
analyze, by the inspection computer, signed inspection results including at least one of i) the one or more signed inspection results, and ii) the at least one signed manual inspection result, and perform additional verification of the signed inspection results when a result of the analyzing meets a predefined criterion specified by the inspection management policy, wherein the additional verification determines whether to send inspected data corresponding to the received data to the destination computer;
wherein the inspection management policy includes a list of predefined orders of one or more inspectors comprised in the inspection computer, and the received data is inspected and signed by the one or more inspectors in one of the list of predefined orders, such that each inspector, except for a first inspector, signs on a content including the received data and one or more signatures of one or more preceding inspectors that previously performed the signing, giving rise to a chain of signatures, and wherein the additional verification comprises verifying completeness and accuracy of each signature in the chain of signatures, and whether an order of the chain of signatures belongs to the list of predefined orders.

11. The inspection computer according to claim 10, wherein the inspection computer comprises the one or more inspectors configured with the one or more filtering mechanisms and associated with one or more secure signing mechanisms, and wherein the received data is separately inspected by each inspector using a respective filtering mechanism thereof and each of the one or more inspection results is separately signed by a corresponding inspector using a respective secure signing mechanism thereof.

12. The inspection computer according to claim 11, wherein the manual inspection is performed by at least one manual inspector each associated with a secure signing mechanism, and the signing of the at least one manual inspection result is performed separately by each of the at least one manual inspectors using the secure signing mechanism associated therewith.

13. The inspection computer according to claim 12, wherein at least some of i) the secure signing mechanisms associated with the one or more inspectors, and ii) the secure signing mechanism associated with each of the at least one manual inspector, is cryptographic signing executed in a secure environment.

14. The inspection computer according to claim 13, wherein the cryptographic signing is executed in a designated secure enclave of a protected memory region.

15. The inspection computer according to claim 13, wherein each of the one or more inspectors and the at least one manual inspector has a respective secure enclave designated thereto, and has a secure signing mechanism associated therewith which is cryptographic signing executed in the designated secure enclave.

16. The inspection computer according claim 10, wherein the one or more filtering mechanisms are selected from a group of filtering mechanisms comprising malware detection, data leak prevention, expression recognition, format conversion, redacting modification and data filtration.

17. The inspection computer according to claim 10, wherein one or more attributes associated with the received data are selected from a group comprising: one or more attributes of the received data, one or more attributes of the source computer that sends the data, and one or more attributes of an environment in which the data is sent.

18. The inspection computer according to claim 10, wherein the additional verification comprises verifying completeness and accuracy of the one or more signed inspection results and/or the at least one signed manual inspection result.

19. A non-transitory computer readable storage medium tangibly embodying a program of instructions that, when executed by a computer, causing the computer to perform a method of secure communication between a source computer and a destination computer, the method comprising:
   upon operatively connecting the source computer and the destination computer with an inspection computer, receiving, by the inspection computer, data sent by the source computer to the destination computer;
   inspecting, by the inspection computer, the received data using one or more filtering mechanisms, giving rise to one or more inspection results each corresponding to a respective filtering mechanism, each inspection result indicative of an inspected status of the received data;
   separately signing, by the inspection computer, each of the one or more inspection results, giving rise to one or more signed inspection results;
   determining, by the inspection computer and based on an inspection management policy, whether to send at least some of the inspection results and/or derivatives thereof for manual inspection, wherein the inspection management policy is specified with respect to one or more attributes associated with the received data;
   upon a positive determination, providing manual inspection of the at least some inspection results and/or derivatives thereof sent by the inspection computer, giving rise to at least one manual inspection result indicative of an approval status, and providing signing of the at least one manual inspection result, giving rise to at least one signed manual inspection result; and
   analyzing, by the inspection computer, signed inspection results including at least one of i) the one or more signed inspection results, and ii) the at least one signed manual inspection result, and performing additional verification of the signed inspection results when a result of the analyzing meets a predefined criterion specified by the inspection management policy, wherein the additional verification determines whether to send inspected data corresponding to the received data to the destination computer;
   wherein the inspection management policy includes a list of predefined orders of one or more inspectors comprised in the inspection computer, and the received data is inspected and signed by the one or more inspectors in one of the list of predefined orders, such that each inspector, except for a first inspector, signs on a content including the received data and one or more signatures of one or more preceding inspectors that previously performed the signing, giving rise to a chain of signatures, and wherein the additional verification comprises verifying completeness and accuracy of each signature in the chain of signatures, and whether an order of the chain of signatures belongs to the list of predefined orders.

* * * * *